(12) United States Patent
Iino

(10) Patent No.: US 9,359,970 B2
(45) Date of Patent: Jun. 7, 2016

(54) OUTPUT CONTROL DEVICE FOR INTERNAL COMBUSTION ENGINE

(75) Inventor: Hayato Iino, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 478 days.

(21) Appl. No.: 13/824,619

(22) PCT Filed: Aug. 17, 2011

(86) PCT No.: PCT/JP2011/068616
§ 371 (c)(1),
(2), (4) Date: Mar. 18, 2013

(87) PCT Pub. No.: WO2012/039215
PCT Pub. Date: Mar. 29, 2012

(65) Prior Publication Data
US 2013/0191007 A1    Jul. 25, 2013

(30) Foreign Application Priority Data

Sep. 21, 2010    (JP) .................................. 2010-210968

(51) Int. Cl.
*F02D 41/14*    (2006.01)
*F02D 29/06*    (2006.01)
(Continued)

(52) U.S. Cl.
CPC ................ *F02D 45/00* (2013.01); *B60W 10/06* (2013.01); *B60W 10/08* (2013.01); *B60W 20/00* (2013.01);
(Continued)

(58) Field of Classification Search
CPC .............. F02D 41/1475; F02D 41/021; F02D 2200/002; F02D 2250/18; F02D 2250/21; F02D 2250/24; F02D 45/00; F02D 29/06; B60W 10/06; B60W 10/08; B60W 20/00; B60W 20/1088; B60W 20/10; B60W 20/106; B60W 2510/244; B60K 6/46

USPC ................ 701/102, 103; 903/906, 905, 40 R; 290/40 C, 40 A, 40 R, 40 B; 180/65.245, 180/65.28, 65.29, 65.31
See application file for complete search history.

(56) References Cited

U.S. PATENT DOCUMENTS 5,785,138 A * 7/1998 Yoshida ................... 180/65.245
6,009,965 A * 1/2000 Takanohashi et al. ..... 180/65.26
(Continued)

FOREIGN PATENT DOCUMENTS

DE    102005008156 A1    9/2006
DE    102006013296 A1    9/2007
(Continued)

OTHER PUBLICATIONS

International Search Report, dated Sep. 13, 2011, which issued during the prosecution of International Patent Application No. PCT/JP2011/068616, of which the present application is the national phase.
(Continued)

*Primary Examiner* — Lindsay Low
*Assistant Examiner* — George Jin
(74) *Attorney, Agent, or Firm* — Troutman Sanders LLP

(57) ABSTRACT

An output control device for an internal combustion engine mounted on an electrically powered vehicle has a power generator driven by the engine, a drive battery that saves a power generated by the power generator and detects an SOC value of a power saving state, and a drive motor that propels a vehicle by using the power generated by the power generator or the power saved in the drive battery, and controls an output of the engine at a time of power generation of the power generator. The output control device sets an engine output determination value corresponding to a boundary at which an operation state of the engine shifts from stoichiometric operation to enriched operation, and limits an output of the engine to equal to or less than the engine output determination value in correspondence with the detected SOC value of the drive battery.

1 Claim, 6 Drawing Sheets

(51) Int. Cl.
    *F02D 45/00*       (2006.01)
    *B60W 10/06*       (2006.01)
    *B60W 10/08*       (2006.01)
    *B60W 20/00*       (2016.01)
    *F02D 41/02*       (2006.01)

(52) U.S. Cl.
    CPC .......... *F02D 29/06* (2013.01); *B60W 2510/244* (2013.01); *F02D 41/021* (2013.01); *F02D 41/1475* (2013.01); *Y02T 10/6286* (2013.01)

(56) References Cited

U.S. PATENT DOCUMENTS

| | | | |
|---|---|---|---|
| 6,079,204 A * | 6/2000 | Sun et al. | 60/274 |
| 6,209,672 B1 * | 4/2001 | Severinsky | 180/65.23 |
| 6,215,198 B1 * | 4/2001 | Inada et al. | 290/40 C |
| 6,326,702 B1 * | 12/2001 | Yonekura et al. | 290/40 C |
| 8,781,664 B2 * | 7/2014 | Sujan | B60W 10/02 180/65.25 |
| 2007/0204601 A1 * | 9/2007 | Ishii et al. | 60/295 |
| 2008/0309093 A1 * | 12/2008 | Ando et al. | 290/40 |
| 2009/0118939 A1 * | 5/2009 | Heap et al. | 701/54 |
| 2011/0139524 A1 * | 6/2011 | Heinrich et al. | 180/65.265 |
| 2011/0166730 A1 * | 7/2011 | Wang et al. | 701/22 |
| 2012/0208672 A1 * | 8/2012 | Sujan | B60W 10/02 477/5 |
| 2012/0215426 A1 * | 8/2012 | Sato et al. | 701/108 |
| 2013/0190132 A1 * | 7/2013 | Izawa | 477/3 |

FOREIGN PATENT DOCUMENTS

| | | | |
|---|---|---|---|
| DE | 102007002734 A1 | | 7/2008 |
| EP | 2786909 A1 | * | 10/2014 |
| JP | 6-245318 A | | 9/1994 |
| JP | 8-047109 A | | 2/1996 |
| JP | 10-014296 A | | 1/1998 |
| JP | 2000-186590 A | | 7/2000 |
| JP | 3289361 B2 | | 6/2002 |
| JP | 2003-70102 A | | 3/2003 |
| JP | 2004-156505 A | | 6/2004 |
| JP | 2008-133762 A | | 6/2008 |

OTHER PUBLICATIONS

International Preliminary Report on Patentability, dated Apr. 16, 2013, which issued during the prosecution of International Patent Application PCT/JP2011/068616, which corresponds to the present application.

Office Action, dated Jun. 11, 2015, which issued during the prosecution of the corresponding German Patent Application No. 112011103152.

* cited by examiner

F I G. 1
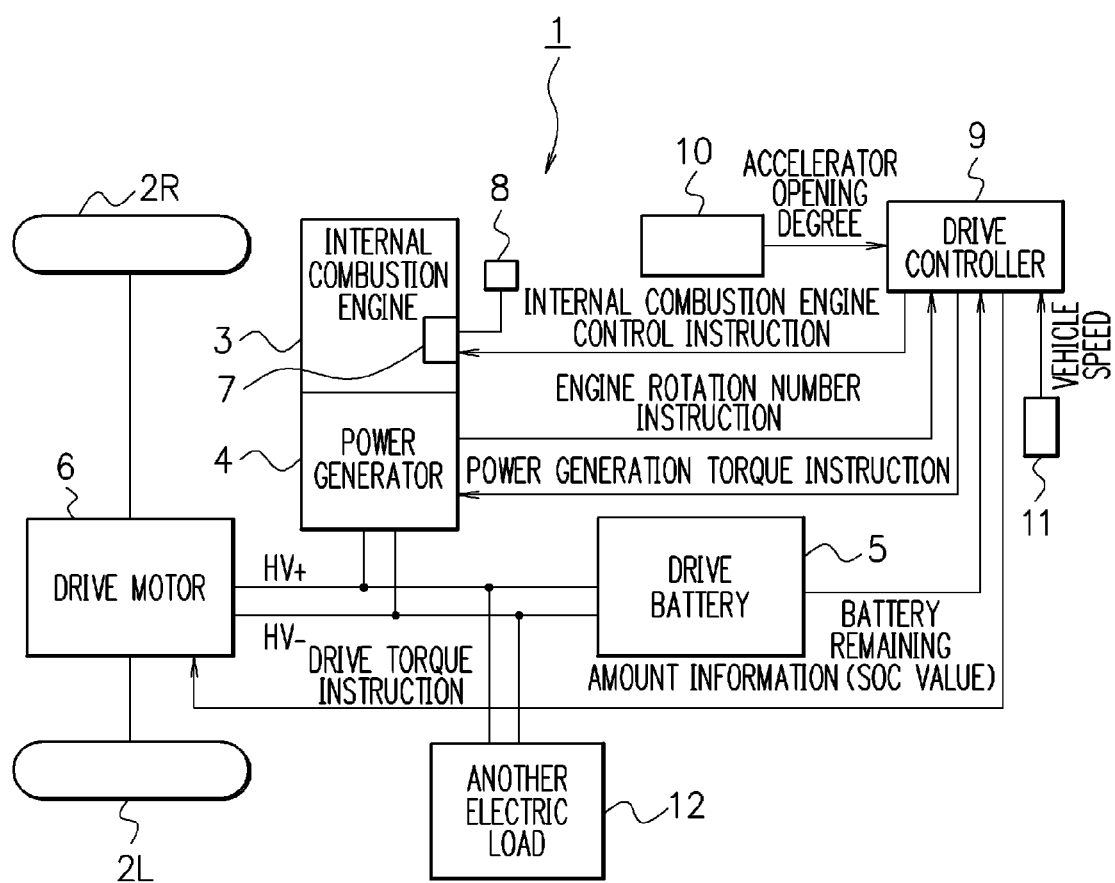

OUTPUT CONTROL DEVICE FOR INTERNAL COMBUSTION ENGINE

CROSS-REFERENCE TO RELATED APPLICATIONS

This is a U.S. national phase application under 35 U.S.C. §371 of International Patent Application No. PCT/JP2011/068616, filed on Aug. 17, 2011, and claims benefit of priority to Japanese Patent Application No. 2010-210968, filed Sep. 21, 2010. The International Application was published on Mar. 29, 2012, as International Publication No. WO 2012/039215 under PCT Article 21(2). The entire contents of these applications are hereby incorporated by reference.

TECHNICAL FIELD

The present invention relates to an output control device for an internal combustion engine, the output control device controlling an output of the internal combustion engine at a time of power generation of a power generator driven by the internal combustion engine mounted on a vehicle.

BACKGROUND ART

With regard to a vehicle, in recent years, a hybrid vehicle as an electrically powered vehicle is proposed and put into practical use for the purpose of improvement of fuel efficiency. The hybrid vehicle is classified into a series type hybrid vehicle which exists as a means for generating electric energy by an internal combustion engine to make a power generator (motor) drive a vehicle by the electric power, and a parallel type hybrid vehicle which rotates a driving wheel by an internal combustion engine and a power generator.

In the series type hybrid vehicle, since the internal combustion engine is not coupled to a driving wheel, traveling in a region where a combustion efficiency of the internal combustion engine is high is possible.

A control device for an electric vehicle engine driven generator according to Patent Literature 1 controls an air-fuel ratio of an internal combustion engine in correspondence with a generated power fluctuation obtained based on a detected generated power, in order that an average generated power comes closer to a lean limit when the average generated power is near a predetermined target value.

A hybrid vehicle according to Patent Literature 2 which detects a torque fluctuation and performs air-fuel ratio control controls an air-fuel ratio of an internal combustion engine based on a fluctuation amount of a generated power of a power generator in a quasi normal operation state where a fluctuation of an operating condition of the internal combustion engine is equal to or less than a predetermined amount.

CITATION LIST

Patent Literature

Patent Literature 1: Japanese Patent No. 3289361
Patent Literature 2: Japanese Laid-open Patent Publication No. 2004-156505

SUMMARY OF INVENTION

Technical Problem

However, in a series type hybrid vehicle, driving is done in an enriched region with a bad efficiency at a time of high-intensity operation of an internal combustion engine, which causes fuel efficiency deterioration and exhaust gas aggravation.

Further, the series type hybrid vehicle is configured that the internal combustion engine operates to secure a power equivalent to a generation output of a power generator in order to prevent deterioration of a state of charge/battery remaining amount (hereinafter, referred to as an "SOC (state of charge) value") being a power saving state. Further, in order to make the SOC value an arbitrary SOC target value, when the SOC value is less than the SOC target value the internal combustion engine drives to secure a power equal to or more than the generation output of the power generator so that the SOC value can be recovered.

However, when the generation output of the power generator is larger than a value covered by operation in a stoichiometric region of the internal combustion engine, operation in an enriched region is done by necessity, and there is an inconvenience that fuel efficiency deterioration and exhaust gas aggravation are brought about.

Thus, an object of the present invention is to provide an output control device for an internal combustion engine which reduces chances of operating the internal combustion engine in an enriched region, to improve an operation efficiency and a fuel efficiency performance and to prevent aggravation of exhaust gas.

Solution to Problem

An output control device for an internal combustion engine according to the present invention is an output control device for an internal combustion engine mounted on an electrically powered vehicle having: a power generator driven by the internal combustion engine; a drive battery capable of saving a power generated by the power generator and capable of detecting an SOC value of a power saving state; and a drive motor capable of propelling a vehicle by using the power generated by the power generator or the power saved in the drive battery, and controlling an output of the internal combustion engine at a time of power generation of the power generator, the output control device setting an engine output determination value corresponding to a boundary at which an operation state of the internal combustion engine shifts from stoichiometric operation to enriched operation, and limiting an output of the internal combustion engine to equal to or less than the engine output determination value in correspondence with the detected SOC value of the drive battery.

Further, the output control device for the internal combustion engine according to the present invention is also characterized in that when the detected SOC value is equal to or more than a predetermined value being a lower limit value in a common range of the drive battery, the output of the internal combustion engine is limited to equal to or less than the engine output determination value. The output control device for the internal combustion engine according to the present invention is further characterized in that when the detected SOC value is less than the predetermined value, limitation to make the output of the internal combustion engine equal to or less than the engine output determination value is released.

Further, the output control device for the internal combustion engine according to the present invention is also characterized in that the output of the internal combustion engine associated with power generation is obtained by adding an actual drive motor output computed based on an acceleration opening degree operated by a driver and a battery request power computed based on the detected SOC value of the drive battery, and when the output of the internal combustion engine is equal to or less than the engine output determination value, limiting to make the output of the internal combustion engine equal to or less than the engine output determination value is not done regardless of a magnitude relation between the detected SOC value and the predetermined value.

Advantageous Effects of Invention

According to the present invention, chances of operating an internal combustion engine in an enriched region can be decreased, and it is possible to improve an operation efficiency and a fuel efficiency performance and to prevent aggravation of exhaust gas.

BRIEF DESCRIPTION OF DRAWINGS

FIG. 1 is a diagram showing a system configuration of a series type hybrid vehicle according to a first embodiment;

DESCRIPTION OF EMBODIMENTS

Figure 2:
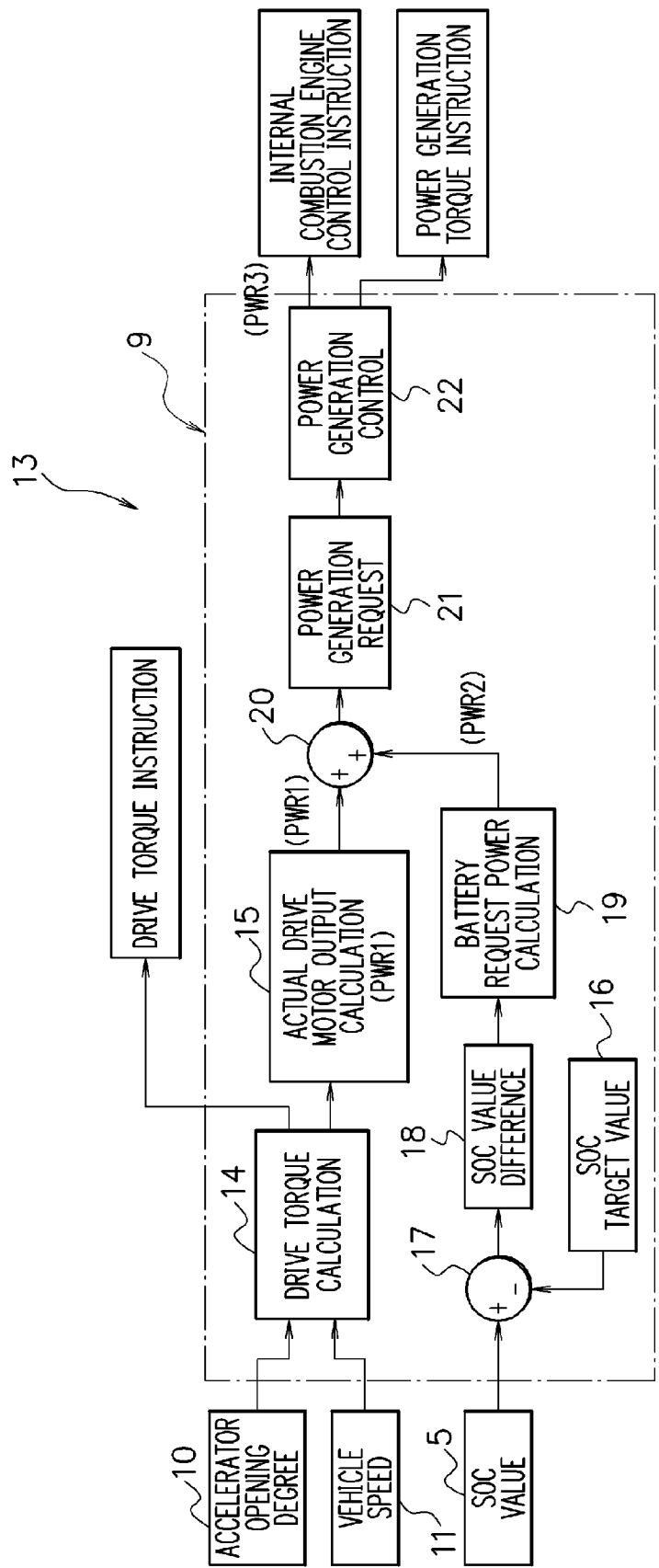
FIG. 2 is a block diagram showing a configuration of an output control device deciding a generated power.

Hereinafter, preferred embodiments of the present invention will be described with reference to the attached drawings.

First Embodiment

A first embodiment of the present invention will be described with reference to FIG. 1 to FIG. 6. FIG. 1 is a diagram showing a system configuration of a series type hybrid vehicle according to the present embodiment. A reference numeral 1 indicates a series type hybrid vehicle (hereinafter, referred to as a "hybrid vehicle") being an electrically powered vehicle, a reference numeral 2L indicates a left driving wheel, and a reference numeral 2R indicates a right driving wheel.

On the hybrid vehicle 1 are mounted an internal combustion engine 3, a power generator 4 driven by the internal combustion engine 3, a drive battery 5 which can save a power generated by the power generator 4 and can detect an SOC value of a power saving state, and a drive motor 6 which can propel the vehicle 1 by using the power generated by the power generator 4 or the power saved in the drive battery 5.

The internal combustion engine 3 has an engine control device 7 which controls a fuel injection amount, an ignition timing, or the like to control a combustion state into stoichiometric operation or enriched operation. The engine control device 7 performs feedback control of an air-fuel ratio of the internal combustion engine 3 by using an exhaust gas sensor 8, further performs fuel injection control in which an appropriate amount of fuel is supplied in relation to a detected intake air amount, and performs known various correction control based on an engine temperature (cooling water temperature) or the like.

The power generator 4, the drive motor 6, and the engine control device 7 communicate with a drive controller 9 as an output drive control means. The drive controller 9 communicates with the drive battery 5 in order to input the SOC value, and communicates with an acceleration sensor 10 detecting an accelerator opening degree and a vehicle speed sensor 11 detecting the vehicle speed. Then, the drive controller 9 outputs an internal combustion engine control instruction (PWR3) to thereby drive control the internal combustion engine 3, outputs a power generation torque instruction to thereby drive control the power generator 4, and outputs a drive torque instruction to thereby drive control the drive motor 6.

Further, another electric load 12 is connected between the power generator 4 and the drive battery 5.

Further, on the hybrid vehicle 1 are mounted, as shown in FIG. 2, an output control device 13 which includes the drive controller 9 and controls an output of the internal combustion engine at a time of power generation of the power generator 4, in order to decide a generated power.

The output control device 13 has, as shown in FIG. 2, a drive torque calculating unit 14, an actual drive motor output calculating unit 15, an SOC value comparing unit 17, an SOC deviation computing unit 18, a battery request power calculating unit 19, an output comparing unit 20, a power generation requesting unit 21, and a power generation control unit 22. The drive torque calculating unit 14, communicating with the acceleration sensor 10 and the vehicle speed sensor 11, calculates the drive torque instruction and outputs the drive torque instruction to the drive motor 6. The actual drive motor output calculating unit 15, communicating with the drive torque calculating unit 14, calculates an actual drive motor output (PWR1). The SOC value comparing unit 17, communicating with the drive battery 5 and an SOC target value setting unit 16, compares an SOC value from the drive battery 5 and an SOC target value from the SOC target value setting unit 16. The SOC deviation computing unit 18, communicating with the SOC value comparing unit 17, computes a deviation between the SOC value and the SOC target value. The battery request power calculating unit 19, communicating with the SOC deviation computing unit 18, calculates a battery request power (PWR2). The output comparing unit 20, communicating with the battery request power calculating unit 19 and the actual drive motor output calculating unit 15, compares the battery request power (PWR2) and the actual drive motor output (PWR1). The power generation requesting unit 21, communicating with the output comparing unit 20, performs power generation request. The power generation control unit 22, communicating with the power generation requesting unit 21, controls and outputs the internal combustion engine control instruction (PWR3) and the power generation torque instruction.

Here, the drive controller 9 transmits the internal combustion engine control instruction (PWR3) to the internal combustion engine 3 in order to generate a power to be consumed by the drive motor 6 and another electric load 12, and transmits the power generation torque instruction to the power generator 4 and performs control. On this occasion, the drive controller 9 controls so that power consumption=generated power is valid in general. Further, by using the drive battery 5 as a power buffer, a difference of a power balance is charged/discharged, and thereby it is not necessarily required that moment values of a power consumption and a generated power match each other.

Figure 3:
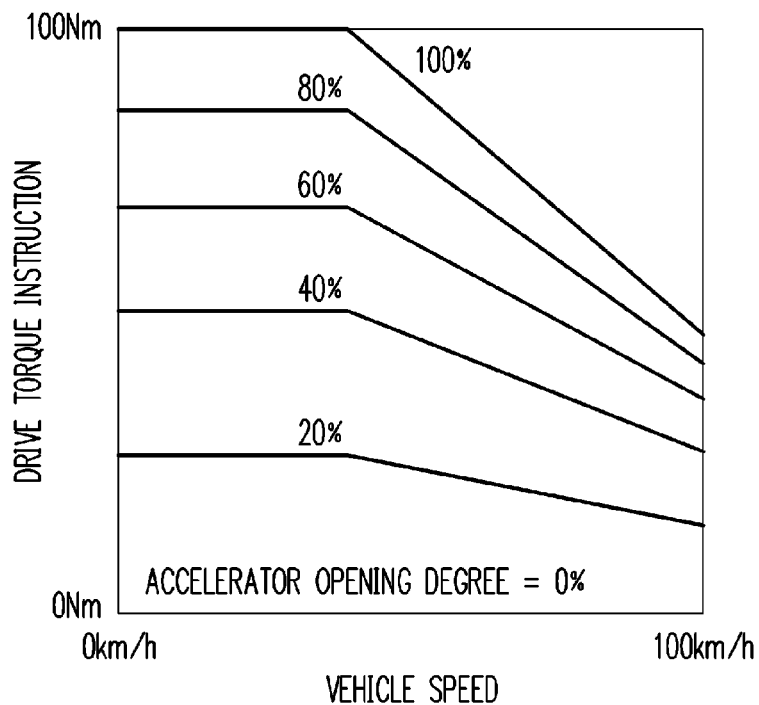
FIG. 3 is a diagram showing an example of a graph for obtaining a drive torque instruction from a vehicle speed.

Further, in the drive torque calculating unit 14, a drive torque instruction is obtained from a vehicle speed according to a graph shown in FIG. 3, for example.

Figure 4:
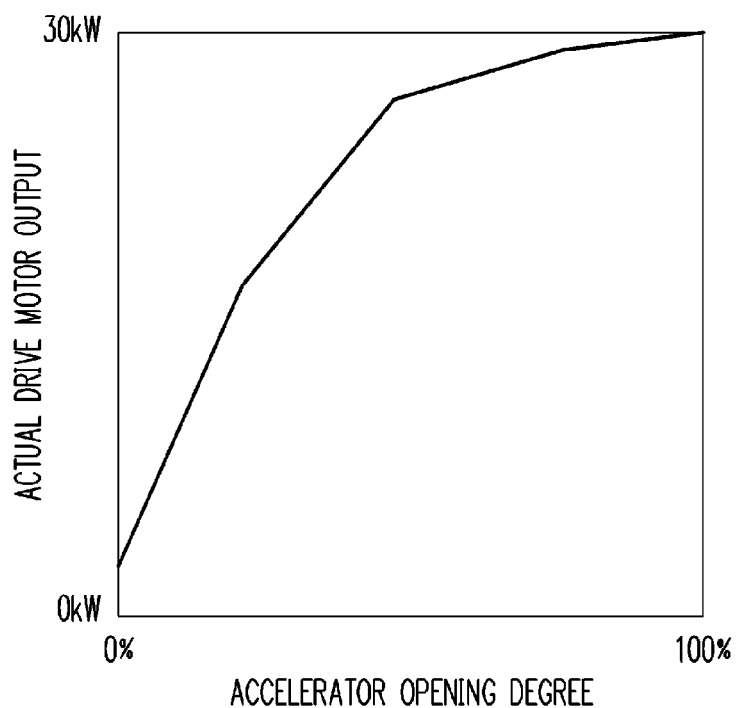
FIG. 4 is a diagram showing an example of a graph for obtaining an actual drive motor output from an accelerator opening degree.

Further, in the actual drive motor output calculating unit 15, an actual drive motor output (PWR1) is obtained from an accelerator opening degree changed artificially, according to a graph shown in FIG. 4, for example.

Figure 5:
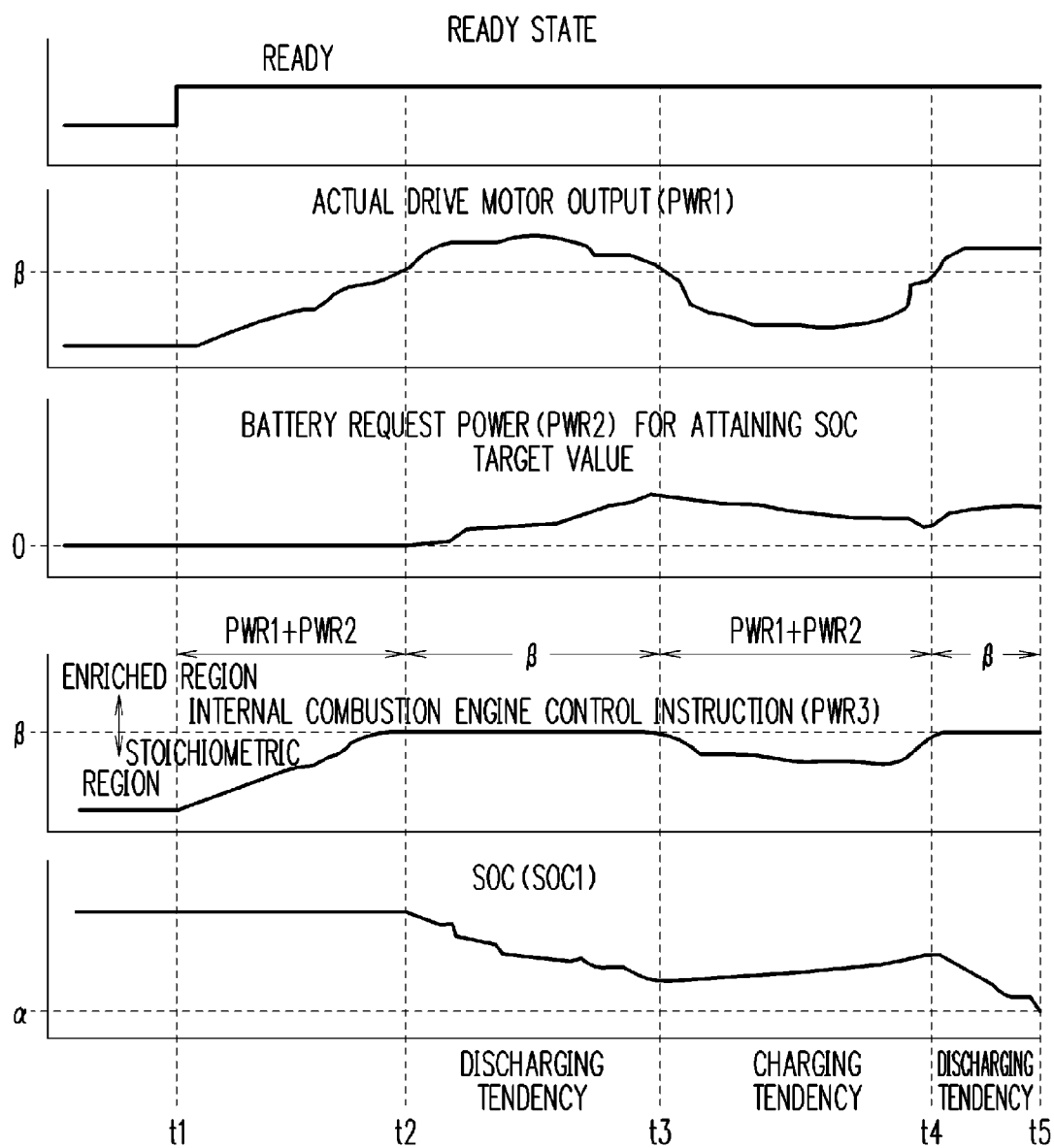
FIG. 5 is a time chart of output control of an internal combustion engine in the first embodiment.

Then, the drive controller 9 of the output control device 13, as shown in FIG. 5, sets an engine output determination value ($\beta$) corresponding to a boundary at which an operation state of the internal combustion engine 3 shifts from stoichiometric operation to enriched operation, and limits an output of the internal combustion engine 3 to equal to or less than the engine output determination value ($\beta$) in correspondence with a detected SOC value of the drive battery 5.

Thereby, it is possible to suppress the enriched operation in correspondence with the detected SOC value of the drive battery 5, and it is possible to secure a fuel efficiency performance and to secure an exhaust gas purification performance (to reduce a harmful component).

Further, an output of the internal combustion engine 3 associated with power generation is obtained, as shown in FIG. 5, by adding an actual drive motor output (PWR1) computed based on an accelerator opening degree operated by a driver and a battery request power (PWR2) computed based on a detected SOC value of the drive battery 5, and when the output of the internal combustion engine 3 is equal to or less than the engine output determination value ($\beta$), limiting is not done regardless of a magnitude relation between the detected SOC value and a predetermined value ($\alpha$).

Thereby, it is possible to do limiting when the output of the internal combustion engine 3 obtained by adding the actual drive motor output (PWR1) and the battery request power (PWR2) is higher than the engine output determination value ($\beta$) and the detected SOC value of the drive battery 5 is high, and not to do limiting to make the output of the internal combustion engine 3 equal to or less than the engine output determination value ($\beta$) when the output of the internal combustion engine 3 obtained by adding the actual drive motor output (PWR1) and the battery request power (PWR2) is higher than the engine output determination value ($\beta$) but the detected SOC value of the drive battery 5 is low, so that security of drive torque for propelling a vehicle which reflects a driver's request and maintenance of the SOC of the drive battery 5 can stand together.

Further, when the output of the internal combustion engine 3 obtained by adding the actual drive motor output (PWR1) and the battery request power (PWR2) is low, limiting to make the output of the internal combustion engine 3 to equal to or less than the engine output determination value ($\beta$) is not done, and thus security of drive torque for propelling a vehicle reflecting a driver's request and maintenance of the SOC of the drive battery 5 can stand together.

Next, the output control of the internal combustion engine 3 according to the first embodiment will be described based on a flowchart of FIG. 6. The drive controller 9 is configured to have a CPU and a memory device such as a ROM and a RAM, and as a result that the CPU executes a program on the memory device, the following processing is performed.

Figure 6:
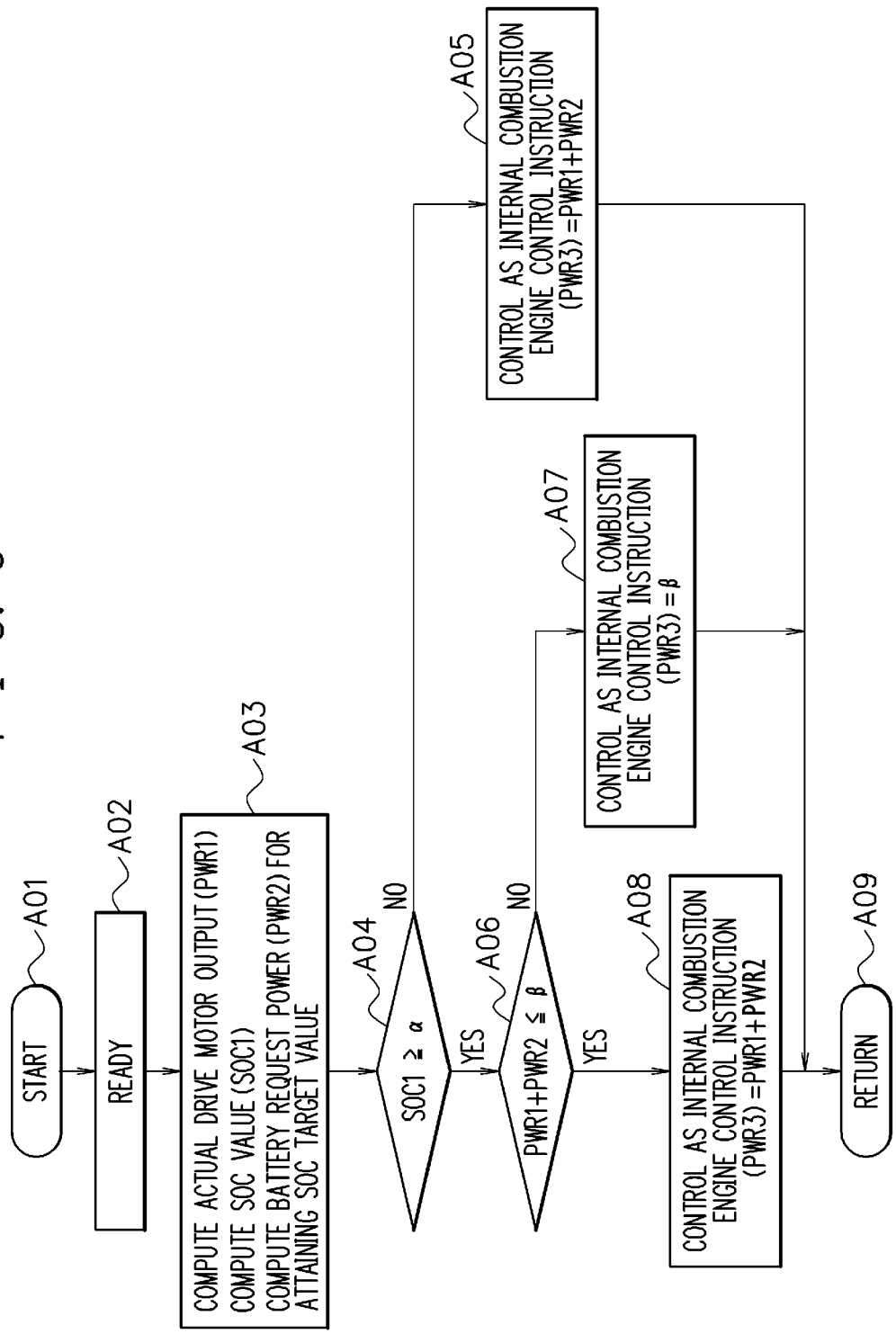
FIG. 6 is a flowchart of the output control of the internal combustion engine in the first embodiment.

As shown in FIG. 6, when the program starts in the drive controller 9 (step A01), a preparation state (READY state), that is, a movable state (including standby) (step A02) is brought about.

Then, an actual drive motor output (PWR1) is computed and an SOC value (SOC1) is computed, and further, a battery request power (PWR2) as a request power for attaining an SOC target value is computed (step A03).

Next, it is judged whether or not SOC1≥predetermined value ($\alpha$) is valid (step A04).

When the step A04 indicates NO, it is judged that the SOC value cannot be reduced any more and that recovery of the SOC value is necessary, and PWR1+PWR2 is made an internal combustion engine control instruction (PWR3) (step A05) to recover the SOC value. In this case, the SOC value is recovered by a portion of the battery request power (PWR2).

On the other hand, when the step A04 indicates YES, it is judged that the SOC value exceeds an allowable minimum value ($\alpha$), and PWR1+PWR2 and an engine output determination value ($\beta$) at which the internal combustion engine 3 is required to be driven in an enriched region are compared, that is, it is judged whether or not PWR1+PWR2≤$\beta$ is valid (step A06).

When the steps A06 indicates NO, the internal combustion engine control instruction (PWR3) is set to be the engine output determination value ($\beta$) (step A07) so that the internal combustion engine 3 is not driven in the enriched region, whereby deterioration of a fuel efficiency and aggravation of exhaust gas are prevented.

On the other hand, when the step A06 indicates YES, control is performed while PRW1+PRW2 is made the internal combustion engine control instruction (PWR3) (step A08).

After the processing of the step A05, after the processing of the step A07, or after the processing of the step A08, the program is returned (step A09).

Next, the output control of the internal combustion engine 3 according to the first embodiment will be described based on a time chart of FIG. 5.

In an example shown in FIG. 5, when the preparation state (READY state) is brought about (time t1), the actual drive motor output (PWR1) does not exceed the engine output determination value ($\beta$), and thus the output of the internal combustion engine 3 is PWR1+PWR2. During the time t1 to a time t2, since the battery request power (PWR2) is 0 (zero), the internal combustion engine control instruction (PWR3) is practically driven by the actual drive motor output (PWR1).

Though the actual drive motor output (PWR1) exceeds the engine output determination value ($\beta$) at the time t2, the SOC value is equal to or more than the predetermined value ($\alpha$) at this time, and thus the internal combustion engine control instruction (PWR3) is limited to the engine output determination value ($\beta$) (time t2 to time t3). During the time t2 to the time t3, since the output of the internal combustion engine 3 is limited to the engine output determination value ($\beta$), the drive battery 5 has a discharging tendency.

At the time t3, the actual drive motor output (PWR1) becomes equal to or less than the engine output determination value ($\beta$), the internal combustion engine control instruction (PWR3) is driven at actual drive motor output (PWR1)+ battery request power (PWR2) for attaining the SOC target value, to recover the SOC value (time t3 to time t4). Note that during the time t3 to the time t4, since the output of the internal combustion engine 3 is PWR1+PWR2, the drive battery 5 has a charging tendency.

At the time t4, the actual drive motor output (PWR1) exceeds the engine output determination value ($\beta$) again, but the SOC value is equal to or more than the predetermined value ($\alpha$), and thus the internal combustion engine control instruction (PWR3) is limited to the engine output determination value ($\beta$) (time t4 to time t5). During the time t4 to the time t5, since the output of the internal combustion engine 3 is limited to the engine output determination value ($\beta$), the drive battery 5 has a discharging tendency.

As is known from FIG. 5, the engine output determination value ($\beta$) is a power as a boundary at which a combustion state of the internal combustion engine shifts and also shows that a supply state of a power supplied to the actual drive motor output (PWR1) is switched. Comparison of the internal combustion engine control instruction (PWR3) and β means that the combustion state of the internal combustion engine is considered and that the power is limited, and comparison of the actual drive motor output (PWR1) and β means not only that the power is limited but also that the power supply state to the drive motor is considered.

Further, since PWR3=PWR1+PWR2 and PWR2≥0 are valid, if PWR1>β is valid, PWR3>β is also valid. Based on the above, PWR1≤β is a necessary condition for realization of a not-limited state where PWR3≤β is valid.

In other words, a method for deciding a generated power in the output control device 13 according to the first embodiment includes, as shown in FIG. 2, calculating the actual drive motor output (PWR1) based on the drive torque to the drive motor 6 which is necessary for vehicle traveling. Further, the drive torque instruction to the drive motor 6 is, as shown in FIG. 3, calculated from a vehicle speed.

A power generation amount, which affects vehicle traveling, is closely related to an operation state of the internal combustion engine 3. Thus, in order for a driver not to have a sense of incompatibility due to divergence from a drive state of the internal combustion engine 3 which drive state is expected as a result of operation, the actual drive motor output (PWR1) is decided, as shown in FIG. 4, based on a drive state, mainly an accelerator opening degree (throttle opening degree) based on the driver's artificial operation.

Then, as shown in FIG. 2, an SOC deviation being a difference between an SOC value (charging state, battery remaining amount) and an SOC target value is obtained, and based on the SOC deviation, calculation of the battery request power (PWR2) for attaining the SOC target value is performed. As a result, the SOC value is controlled to be a positive/negative battery request power (PWR2) based on the SOC deviation, that is, controlled to be respective states of charging/discharging, and therefore, the SOC value falls in a range centering on the SOC target value. This is feedback control.

The actual drive motor output (PWR1) and the battery request power (PWR2) for attaining the SOC target value are added and a power generation request is obtained. Final generation control is performed according to the power generation request.

Further, in combustion control of the internal combustion engine 3, an internal combustion engine control instruction (PWR3) is obtained based on the power generation request.

When the power generation control is performed according only to an actual drive motor output (PWR1), the drive battery 5 largely tends to have a current influx state or a current outflow state and there is an apprehension that over-charging or over-discharging is brought about, but by the above control, it is possible to avoid such a situation.

Basically, what is obtained by adding a battery request power (PWR2) to an actual drive motor output (PWR1) decided based on artificial operation (accelerator opening degree, throttle opening degree) and on the vehicle speed becomes a final actual power generation amount, that is, an internal engine control instruction (PWR3) being a target output of the internal combustion engine 3.

When output limiting of the internal combustion engine 3 to avoid enriched operation is done, calculated income and outgo do not necessarily match momentarily.

Even when the income and outgo are accumulated as they are, generated divergences are not accumulated and a problem does not occur. It is because, the divergence appears in a charge/discharge amount of the drive battery 5, which appears in the SOC deviation, so that the divergence is corrected as a result of feedback control described separately.

Therefore, the income and outgo match, and in general, power consumption=generated power is valid. Thus, the battery request power (PWR2) becomes a power generation correction amount.

Second Embodiment

A second embodiment of the present invention will be described with reference to FIG. 7. As shown in a flowchart of FIG. 6, in an output control device 13, when a detected SOC value (SOC1) is equal to or more than a predetermined value (α) being a lower limit value in a common range of a drive battery 5, an output of an internal combustion engine 3 is limited to equal to or lower than an engine output determination value (β), and when the detected SOC value is less than the predetermined value (α), limitation to make the output of the internal combustion engine 3 to equal to or less than the engine output determination value (β) is released. In the second embodiment, a case where the detected SOC value is less than the predetermined value (α) (shown on and after a time t5 in FIG. 7) will be described.

Figure 7:
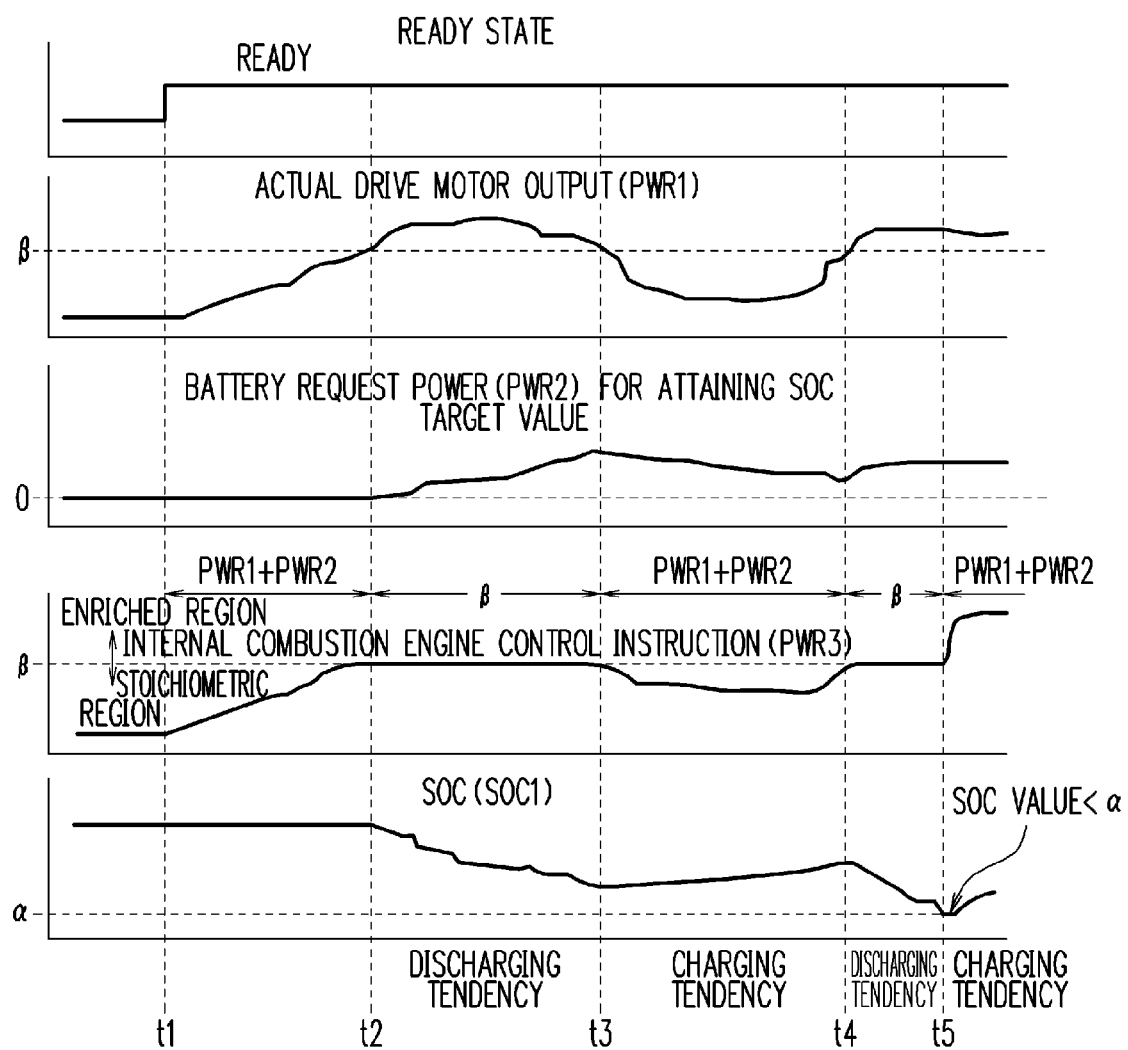
FIG. 7 is a time chart of output control of an internal combustion engine in a second embodiment.

As shown in FIG. 7, during a time at which a preparation state (READY state) is brought about (time t1) to a time t4, a state is similar to that of FIG. 5 described in the first embodiment. During the time t4 to a time t5, an internal combustion engine instruction (PWR3) is limited to the engine output judgment amount (β) and the drive battery 5 has a discharging trend.

Thereafter, when the SOC value becomes less than the predetermined value (α) at the time t5, limitation of the internal combustion engine control instruction (PWR3) is released in order to prevent further reduction of the SOC value, and the internal combustion engine control instruction (PWR3) is driven by actual drive motor request (PWR1)+battery request power (PWR2) for attaining SOC target value, in order for recovery of the SOC value. On and after the time t5, since the output of the internal combustion engine 3 is PWR1+PWR2, the drive battery 5 has a charging tendency.

Thereby, by decreasing frequency of entering an enriched region, enriched operation is suppressed and improvement of a fuel efficiency performance and improvement of an exhaust gas purification performance (decrease of harmful components) can be achieved, and further, the detected SOC value of the drive battery 5 can be made easier to be kept equal to or more than the predetermined value (α), and significant reduction of the SOC value can be prevented.

It is a matter of course that the present invention is not limited to the above embodiments but can be variously adapted or altered.

For example, for an actual drive motor output (PWR1) for supplying a power necessary for traveling, a driver request power generation amount based on artificial operation of the driver, an accelerator opening degree (throttle opening degree), can be obtained by calculation. The driver request power generation amount corresponds to an actual drive motor output (PWR1) being a power generation amount as an output, and in a case of a calculation result of the power generation amount by calculation, the driver request power generation amount is not necessarily required to be matched with a power consumed by a drive motor.

The actual drive motor output (PWR1) can be set to be nonlinear in a manner that an increase gradient becomes smaller when the accelerator opening degree (throttle opening degree) is large than when the accelerator opening degree (throttle opening degree) is small (an increase amount of the power generation amount becomes smaller as the accelerator opening degree increases), as shown in FIG. 4.

INDUSTRIAL APPLICABILITY

An output control device for an internal combustion engine of the present invention can be applied to various vehicles.

The invention claimed is:
1. An output control device for an internal combustion engine mounted on an electrically powered vehicle comprising: a power generator driven by the internal combustion engine; a drive battery capable of saving a power generated by the power generator and capable of detecting an SOC value of a power saving state; and a drive motor capable of propelling a vehicle by using the power generated by at least one of the power generator or the power saved in the drive battery, and controlling an output of the internal combustion engine at a time of power generation of the power generator,
the output control device performing:
setting an engine output determination value corresponding to a boundary at which an operation state of the internal combustion engine shifts from stoichiometric operation to enriched operation,
computing an actual drive motor output based on an acceleration opening degree operated by a driver,
computing a battery request power for an SOC target value based on a detected SOC value of the drive battery, and
limiting an output of the internal combustion engine to equal to or less than the engine output determination value when a sum of the computed actual drive motor output and the computed battery request power exceeds the engine output determination value and the detected SOC value is equal to or more than a predetermined value, wherein the predetermined value is a lower limit value in a common range of the drive battery, and
releasing the output of the internal combustion engine to greater than the engine output determination value when the detected SOC value is less than the predetermined value.

* * * * *